Sept. 15, 1970     R. L. GARRETT ET AL     3,528,221
TRIANGULAR SUPERSONIC FLOW SEPARATOR
Filed May 20, 1968     2 Sheets-Sheet 1
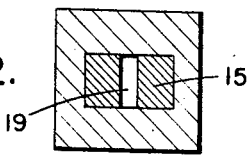
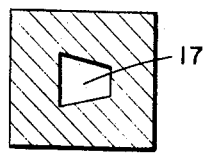
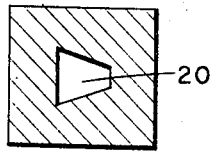
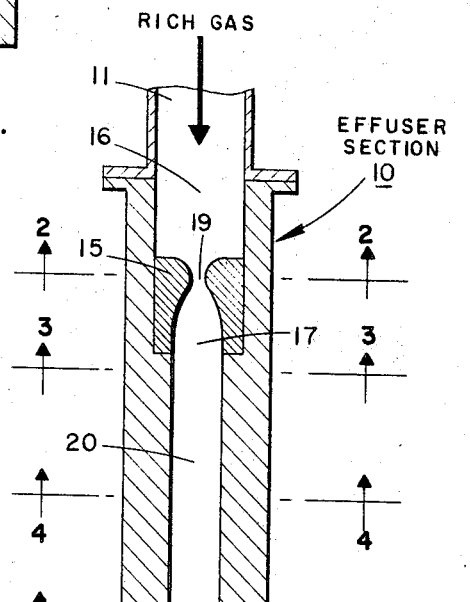
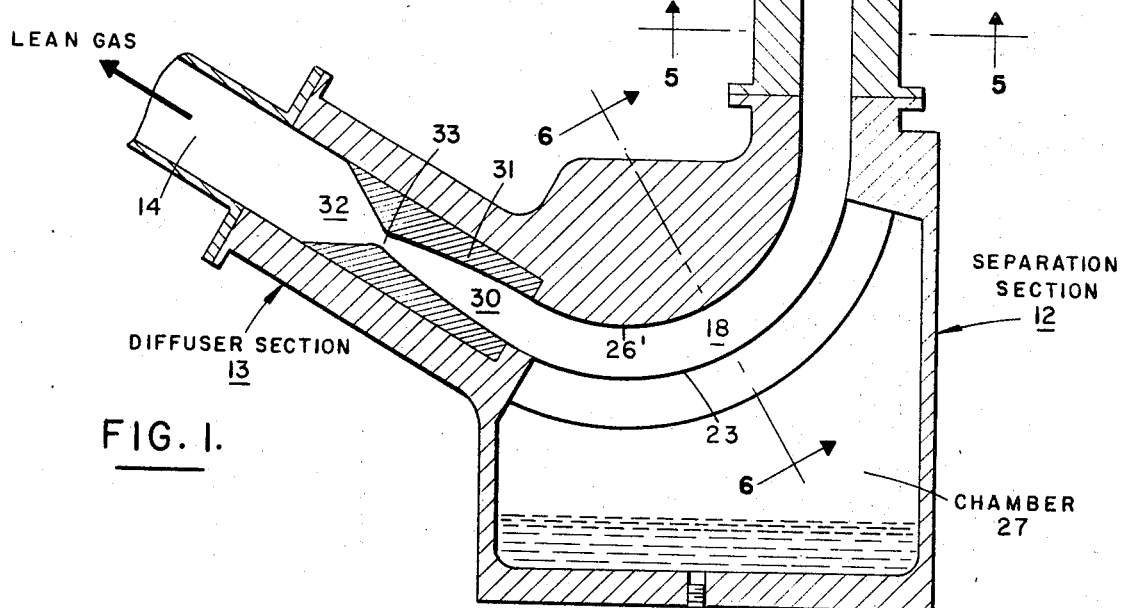
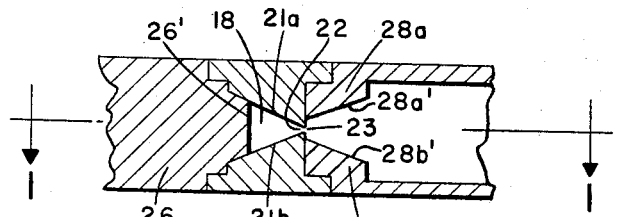
INVENTORS.
ROBERT L. GARRETT,
WILLIAM J. McDONALD, JR
BY John S. Schneider
ATTORNEY.

Sept. 15, 1970   R. L. GARRETT ET AL   3,528,221
TRIANGULAR SUPERSONIC FLOW SEPARATOR
Filed May 20, 1968   2 Sheets-Sheet 2
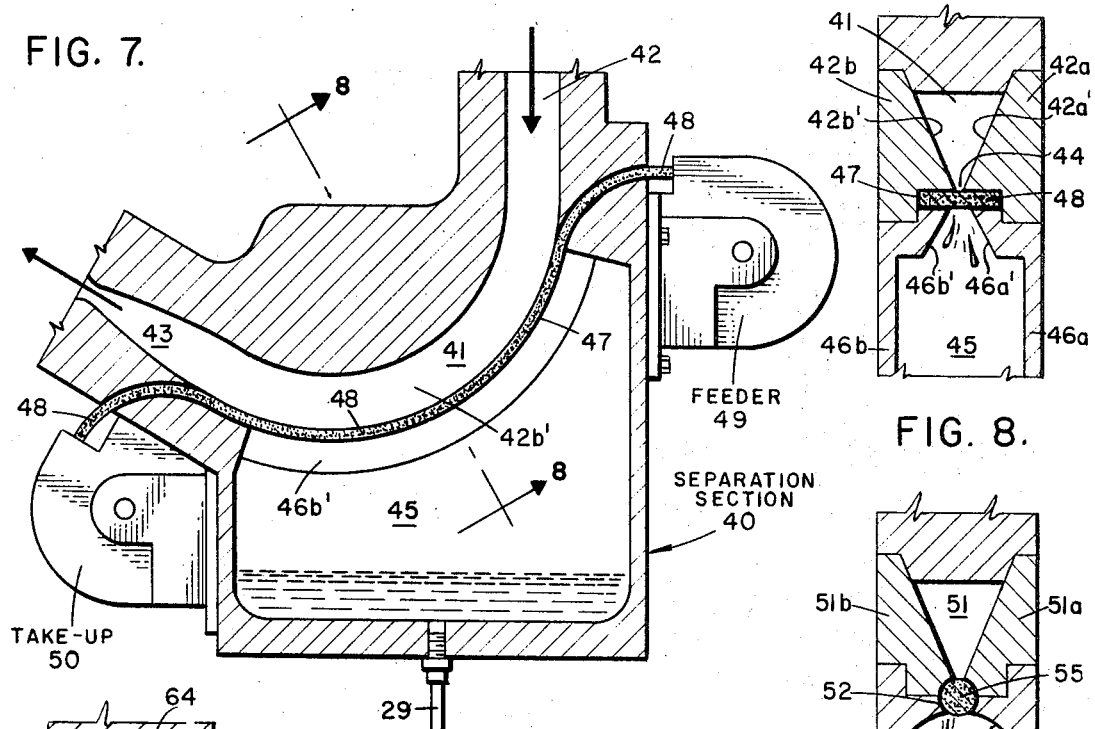
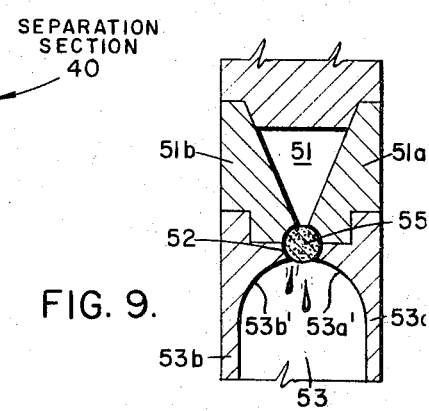
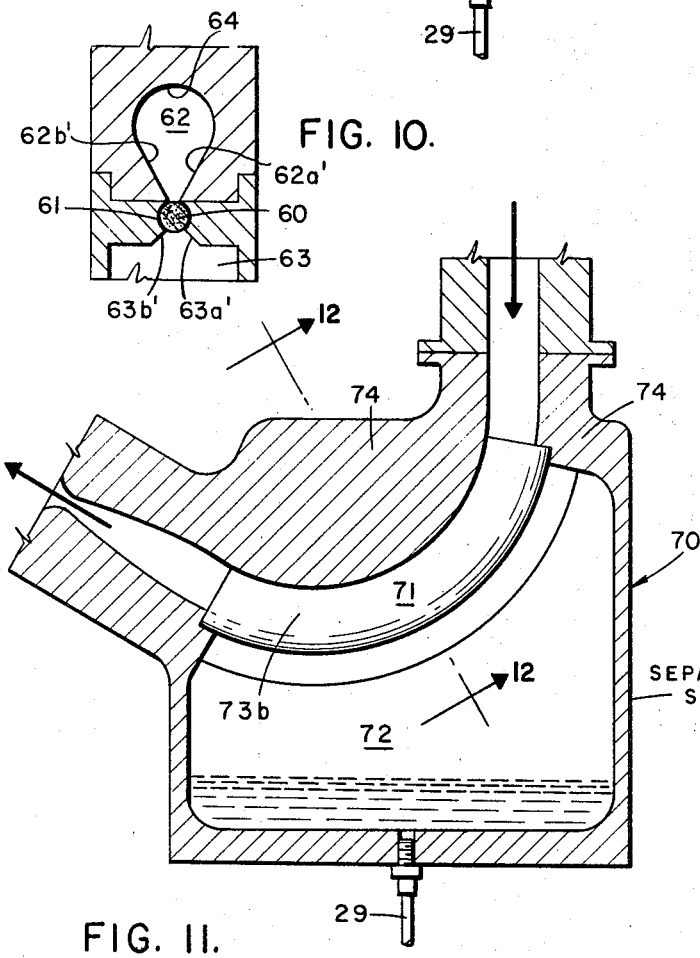
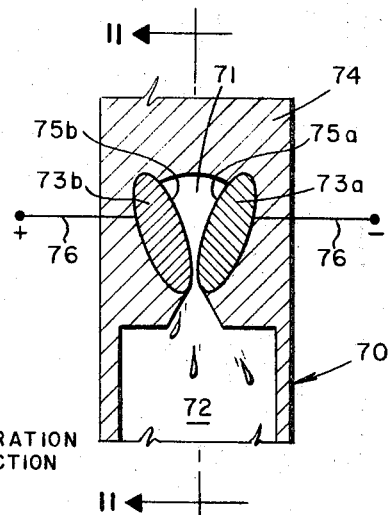
INVENTORS.
ROBERT L. GARRETT,
WILLIAM J. McDONALD, JR
BY
ATTORNEY.

United States Patent Office 3,528,221
Patented Sept. 15, 1970

3,528,221
TRIANGULAR SUPERSONIC FLOW SEPARATOR
Robert L. Garrett and William J. McDonald, Jr., Houston, Tex., assignors to Esso Production Research Company, a corporation of Delaware
Filed May 20, 1968, Ser. No. 730,375
Int. Cl. B03c 3/14
U.S. Cl. 55—127                                  19 Claims

ABSTRACT OF THE DISCLOSURE

An apparatus for separating one or more components from a multicomponent high-pressure gas stream. The gas stream is expanded to supersonic velocities through a supersonic effuser to achieve low temperatures and low pressures in the supersonic gas stream and cause condensed particles to form. The supersonic gas stream is made to traverse a planar bend flow path or passageway in which the particles are inertially moved to the outer boundary of the planar bend where they are separated from the gas stream. The separated particles are collected along with dissolved and entrained gases which also separate from the gas stream. The supersonic gas stream is then decelerated to subsonic flow through a supersonic diffuser and part of the pressure of the gas stream is recovered. Opposing side walls of the planar bend flow path converge toward the outer boundary thereof to an apex. This convergent-type flow path causes concentration of particles as they are inertially moved toward the outer boundary of the planar bend flow path. Convergence of the walls terminates at the apex in a narrow passageway or strait to and through which the condensed particles are inertially moved. A suitable planar bend flow path cross-sectional configuration is triangular or may be essentially triangular having curved walls. An electric field may be applied across the planar bend flow path to increase the rate of liquid particle collision, coalescence and drop growth. A replaceable wall material, either movable or stationary, may be positioned in the narrow passageway at the outer boundary apex of the planar bend flow path.

---

The present invention generally concerns supersonic separation of condensable components of a multi-component high-pressure gas stream. More particularly, the present invention concerns an apparatus in which high efficiency expansion of a gas stream to supersonic velocities cools the gas stream to form essentially a condensed phase. The condensed phase, as liquid and/or solid particles or drops, is inertially moved to the outer boundary of a planar bend flow path where it is separated from the gas stream and collected as such gas stream traverses the planar bend. A diffuser located at the end of the bend compresses and decelerates the gas stream to low subsonic velocities. Gases, either entrained or dissolved in the condensed phase, also are separated from the gas stream along with the liquid phase. The flow path through the separator is normally rectangularly shaped. One known manner of separating the condensed and gas phases is to employ a permeable wall as the outer boundary of the planar bend flow path through which the liquid particles and entrained or dissolved gases pass to a collector therefor.

In accordance with the teachings of the present invention, the planar bend flow path traversed by the gas stream is configured so as to converge opposing side walls of the planar bend flow path to an apex in order to concentrate the particles as they are moved inertially toward the outer boundary of the bend. A strait or narrow passageway is formed at the apex through which the particles and entrained or dissolved gases pass. If desired, a movable or stationary replaceable wall material may be arranged in the strait. Also, an electric field may be applied across the planar bend flow path to enhance growth of the liquid particles. Convergent side walls of the planar bend flow path may suitably form an essentially triangular cross-sectional configuration. The walls of such flow path may be straight or concavely or convexly shaped.

Advantages of the convergent-type planar bend side walls over straight-sided rectangular cross-sectional wall configurations which employ a permeable wall at the outer boundary include less susceptibility to erosion; use of cheaper, tougher and more permeable construction materials permitted; automatic replacement of the permeable wall by mechanical means permitted; and less critical location for the permeable wall permitted since the permeable wall does not entirely define flow boundaries.

The following terms used herein are defined in accordance with general aerodynamic usage:

"Supersonic effuser" means a flow channel having a convergent subsonic section upstream of a divergent supersonic section with an intervening sonic throat which functions as an aerodynamic expander.

"Supersonic diffuser" means a flow channel having a convergent supersonic section upstream of a divergent subsonic section with an intervening sonic throat which functions as an aerodynamic compressor.

"Shock wave" means any discontinuity in supersonic flow across which flow properties abruptly change.

"Normal (90°) shock wave" is a shock wave across which gas velocity changes from supersonic to subsonic, as in a diffuser.

"Final shock wave" is a normal shock wave which occurs at or near the throat of a supersonic diffuser.

"Throat" means a reduced area in a flow channel, as in an effuser or diffuser.

"Contour" means shape of the wall or walls of flow channels, as in an effuser, diffuser or bend.

"Gaseous or gas stream" shall mean a stream completely in the gas phase or one containing liquids and/or solids.

A primary object of the present invention is to provide improved an apparatus in separating condensable components from a multicomponent gas flow stream.

The above object and other objects and advantages of the present invention will be apparent from the following description when taken with the drawings, wherein:

FIG. 1 is a side view illustrating one embodiment of the supersonic expansion separator of the invention;

FIG. 2 is a view taken on lines 2—2 of FIG. 1;

FIG. 3 is a view taken on lines 3—3 of FIG. 1;

FIG. 4 is a view taken on lines 4—4 of FIG. 1;

FIG. 5 is a view taken on lines 5—5 of FIG. 1;

FIG. 6 is a view taken on lines 6—6 of FIG. 1;

FIG. 7 is a side view of a part of a supersonic expansion separator illustrating another embodiment of the present invention.

FIG. 8 is a view taken on lines 8—8 of FIG. 7;

FIG. 9 is a view similar to that shown in FIG. 8 illustrating another embodiment of the present invention;

FIG. 10 is also a view similar to that shown in FIG. 8 illustrating still another embodiment of the present invention;

FIG. 11 is a side view of a part of a supersonic expansion separator illustrating a further embodiment of the present invention; and FIG. 12 is a view taken on lines 12—12 of FIG. 11.

Referring to FIG. 1 the components of the supersonic expansion separator illustrated in that figure are an effuser section 10 connected at its subsonic end to a source of high-pressure gas in inlet conduit 11 and at its supersonic end to a separation section 12. The supersonic end of diffuser section 13 is connected to the downstream end of separation section 12. The subsonic end of diffuser section 13 is connected to a gas stream discharge conduit 14.

Effuser section 10 includes a (replaceable) effuser 15 having a convergent subsonic section 16, connected to inlet conduit 11 and a divergent supersonic section 17 connected to a flow channel 18 of separation section 12. The effuser also has an intervening sonic throat 19. The function of the effuser is to expand gas flowing therethrough essentially isentropic. The design of effusers of this type is well known to the art and may be according to principles described in DRL Publication No. 406 of the Defense Research Laboratories, University of Texas (1957), or the pamphlet by Kuno Foelsch, No. NA-46-235-2, published by North American Aircraft Corporation, May 1946. Other references which describe effuser design methods for rectangular cross-section configurations are "An Accurate and Rapid Method for the Design of Supersonic Nozzles," Beckworth, J. E. and Moore, J. A., NACA Space TN 3322, February 1955; "Nozzles for Supersonic Flow Without Shock Fronts," Shapiro, A. H., Journal of Applied Mechanics, Transactions ASME, vol. 66, p. A-93 (1944); "Supersonic Wind Tunnels—Theory, Design and Performance," J. Ruptash, UTIA Review No. 5, U. of Toronto, I vol. of Aerophysics, June 1952; and "Nozzle Design," Puckett, A. E. Journal of Applied Mechanics, December 1946, p. 265. A reference describing diffuser design methods for circular cross-section configurations is "The Analytical Design of an Axially Symmetric Laval Nozzle for a Parallel and Uniform Jet," Foelsch, J., Journal of Aeronautical Sciences, March 1949, p. 161 ff.

In gas streams expanded by such supersonic effusers, the temperature achieved can be low, dependent upon the amount of condensation occurring. Such temperatures can be predicted for simple flow systems using information given in The Dynamics and Thermodynamics of Compressible Fluid Flow, vols. 1 and 2, by Ascher H. Shapiro, The Ronald Press Company, New York.

The supersonic section 17 of effuser 15 includes a generally divergent straight flow path 20 which is a transition section from rectangular to essentially triangular cross-section as illustrated in FIGS. 2–5. Additionally, this intermediate section is used to provide droplet coalescence in certain appliuations of the supersonic separator; however, it is not a necessary feature in all applications thereof. Flow path or channel 20 is made divergent in order to maintain the gas stream at high velocity. The design of divergent channels of this taype may be found in a number of publications. The Journal of Applied Physics, June 1946, an article by J. H. Keenan and E. P. Newmann entitled, "Measurement of Friction in a Pipe for Subsonic and Supersonic Flow of Air," presents experimental data to substantiate theory on friction losses. An article by R. E. Wilson entitled, Turbulent Boundary Layer Characteristics at Supersonic Speeds—Theory and Experiment," Journal of Aeronautical Sciences, vol 17, p. 585, presents a complete description of channel compensation. As shown in FIGS. 2–5, the supersonic flow path in effuser 15 including flow path 20 gradually changes from rectangular to trapezoidal to a substantially triangular cross-sectional shape.

Flow path or channel 18 is curved and, as illustrated in FIG. 6, its cross-section is essentially triangular. Channel 18 is formed of opposing wall members 21a, b having straight surfaces which converge to an apex 22 to form an outer strait or passageway 23 and an inner wall member 26 having a coplanar curved wall surface 26'. Channel 18 is curved in design in accordance with principles set forth in an article by L. Liccini entitled, "Analytical and Experimental Investigation of 90° Supersonic Turbine Passages Suitable for Supersonic Compressors and Turbines," National Advisory Committee for Aeronautics, RLM 9GO7 (1949), or as in an article by E. Boxer et al. entitled, "Application of Supersonic Vortex Flow Theory to the Design of Supersonic Impulse Compressors or Turbine Blade Sections," National Advisory Committee for Aeronautics, RLM 52BO6 (1952). Channel 18 may also be diverged in accordance with the equations and tables in the aforementioned article by R. E. Wilson. General information on this art may be found in texts such as vols. 1 and 2 of the aforementioned Shapiro reference.

Liquid droplets and particles which separate from the gas stream and pass through strait 22 flow into a collection chamber 27 which is formed in part by supporting walls 28a, b having divergent wall surfaces 28a', b'.

A conduit 29 is connected to chamber 27 for the purpose of discharging gas and liquid collected from chamber 27. The downstream terminal end of the bend or curve of channel 18 connects to the convergent supersonic section 30 of a diffuser 31 which also includes a divergent subsonic section 32 which connects to discharge conduit 14 and an intervening sonic throat 33. The contour of diffuser 31 and the area of throat 33 are preferably made adjustable.

In the operation of the embodiment illustrated in FIGS. 1–6, a high-pressure, multicomponent (rich) gas containing condensable components is conducted through inlet conduit 11 into effuser 15. Expansion cooling occurs in effuser 15 as the gas stream attains supersonic velocities downstream of throat 19 in the divergent supersonic section 17 including divergent channel 20. Condensable components of the gas stream are condensed as liquid droplets and particles. These droplets and particles are moved toward strait 23 on the outer curvature of the bend in channel 18 which pass through strait 23 along with some chamber 27. The remaining supersonic gas stream, now stripped of its condensable components, is decelerated to near zero velocity by diffuser 31 and the pressure of the lean stripped gas approaches that of the rich inlet gas.

An improved liquid droplet recovery is obtained using a triangularly shaped cross-section for the bend of channel 18. Liquid droplets and particles are inertially ejected to the outer curvature of the planar bend and as such liquid droplets and particles move toward strait 23, they eventually contact each other at or near the apex of the triangle. Some of the liquid droplets collide with side wall surfaces 21a', b' of channel 18, but since these wall surfaces converge, droplets move directly toward strait 23. After striking or hitting these angled walls, the droplets are less likely to shatter or bounce. Even if the liquid droplets do bounce off the wall surfaces, they will be brought back to straight 23 by other liquid droplets being funneled into the apex area. Strait 23 passes all of the liquid and solids which flow to collection chamber 27. Such an arrangement is an effective check valve; i.e., a one-way flow system.

The size of strait 23 is designed to keep the strait liquid-filled (exactly filled) at all times to aid in excluding gas from collection chamber 27 and at the same time maintain liquid recovery high. For practical operation, the strait is made adjustable in width for that purpose. Hydrates, paraffins, oil, sand, ice, etc., which plug other types of walls, unless removed or the gas treated in some expensive way, pass through this strait-type wall. Further, in the case of separation of hydrocarbons, the presence of hydrocarbon liquid would augment hydrate, paraffin or oil recovery by the solution effect.

In FIGS. 7 and 8 a modification of the invention is illustrated. In FIG. 7, a separation section 40 containing a planar bend flow path or channel 41 is connected at its upstream end to the divergent supersonic section 42 of an effuser, and at its downstream end to the convergent supersonic section 43 of a diffuser. As shown in FIG. 8, the triangular configuration of channel 41 is the same as the triangular configuration of channel 18 shown in FIG. 5. Side wall surfaces 42a', b' of side wall members 42a, b converge to a strait or passageway 44. Collection chamber 45 is provided with divergent wall surfaces 46a', b' of wall members 46a, b which members together with wall members 42a, b form a rectangularly shaped groove 47. A flat, rectangularly cut ribbon 48 of material such as felt rope or softened plastic or metal mesh having proper permeability, porosity and thickness to restrict passage of gas from flow channel 41 into collection chamber 45 is positioned in groove 47. As illustrated in FIG. 7, material 48 may be replaced by causing it to be moved through groove 47 by means of a ribbon feeder mechanism 49 and a ribbon takeup mechanism 50 which may be manually or automatically operated. Material 48 may also be replaceable in other ways.

As shown in FIGS. 9 and 10, tubular instead of flat material may be used and flow channel and collection chamber shapes may be varied. In FIG. 9, flow channel 51 has the same triangular cross-section as channels 41 and 18, but at the apex thereof a circular cross-sectional groove 52 is formed by the wall members 51a, b of the flow channel and wall members 53a, b of the collection chamber 53. A round rope-like material 55 is located in groove 52. A portion of the inner wall surfaces 53a', b' of collection chamber 53 are curved, not straight, as shown in the previous embodiments.

In FIG. 10, a round, rope-like material 60 is positioned in a circularly configured groove 61; the side wall surfaces of channel 62 and collection chamber 63 are formed straight as indicated at 62a', b' and 63a', b', respectively, and the inner wall surface 64 of channel 62 is curved inwardly.

The wall material can be selected or treated for various applications in which it is to be used. For example, a surface treatment could render the wall material water or oil wet as desired to prevent adhesion of hydrates, paraffin, ice, etc. In addition, electrical properties could be chosen for the wall material to make the wall act as a heating element.

Another embodiment of the invention is illustrated in FIGS. 11 and 12. A separation section 70 includes a planar bend channel or flow path 71 and a collection chamber 72. The side walls 73a, b of flow channel 71 are electrically conductive and form electrodes. They are surrounded by electrical insulation material 74 and the inner side wall surfaces 75a, b thereof are formed convex. Suitable conductors 76 are adapted to place a high potential between the electrodes. This potential may be from an alternating or direct current source.

Application of an intense electric field across flow channel 71 makes the droplets collide and grow larger by dipolar attraction between droplets. When the droplets are closer together, the coalescence rate is greatly increased and bigger droplets form and are more easily recovered from the supersonic gas stream.

The triangular or other convergent-type cross-sectional channel used in the separation section may also be used throughout the entire supersonic flow path portions of the separator if desired.

General diffuser design information, concerning contours, throat areas, lengths and other parameters thereof can be found in the text, Supersonic Inlet Diffusers and Introduction to Internal Aerodynamics, by Dr. Rudolf Hermann, published by Minneapolis-Honeywell Regulator Company, Minneapolis, Minn., and Minneapolis-Honeywell Regulator Company, Ltd., Toronto, Canada, second edition. The diffuser can be made adjustable in its contour and throat area in order to obtain weak shock waves properly located within the convergent portion of the diffuser and a normal (final) shock wave at or near the diffuser throat. The reason for so locating these waves is to achieve maximum pressure recovery by decelerating supersonic flow.

Various modifications may be made in the preferred embodiments shown and described herein within the spirit and scope of the appended claims.

Other supersonic separator apparatus and techniques may be utilized with the concepts disclosed herein such as those illustrated and described in the following copending United States patent applications: Ser. No. 730,372, entitled, "Jet Pump and Supersonic Flow Separator," by Robert L. Garrett, filed May 20, 1968; Ser. No. 730,371, entitled, "Supersonic Flow Separator," by Robert L. Garrett, filed May 20, 1968; Ser. No. 730,373, entitled, "Supersonic Flow Separator With Film Flow Collector," by Robert L. Garrett, filed May 20, 1968; and Ser. No. 730,374, entitled, "Supersonic Flow Separator With Admixing," by Robert L. Garrett and William J. McDonald, Jr., filed May 20, 1968.

Having fully described the apparatus, objects, method and operation of our invention, we claim:

1. Apparatus for condensing and separating components from a multicomponent gas stream comprising:
 a supersonic effuser capable of expanding said gas stream to achieve low temperatures and low pressures in said supersonic gas stream and to form thereby condensed particles;
 separation means through which said gas stream flows adapted to separate said condensed particles from said gas stream; and
 a diffuser capable of decelerating said gas stream to subsonic flow to recover a portion of the pressure of said gas stream, said separation means including a supersonic planar bend having a selected cross-sectional configuration in which the outer curvature of said supersonic planar bend converges to an apex which causes said condensed particles to concentrate as they are inertially moved toward the outer curvature of said supersonic planar bend.

2. Apparatus as recited in claim 1 in which said cross-sectional configuration is triangular, two sides of said triangle converging to an apex which forms a strait at the outer curvature of said supersonic planar bend through which said condensed particles flow.

3. Apparatus as recited in claim 1 in which said cross-sectional configuration is essentially triangular, two sides of said triangle being curved and converging to an apex which forms a strait at the outer curvature of said supersonic planar bend through which said condensed particles flow.

4. Apparatus as recited in claim 1 including means adapted to apply an electric field across said supersonic bend flow path adapted to make said condensed particles collide and grow larger by means of dipolar attraction between particles.

5. Apparatus as recited in claim 4 in which said cross-sectional configuration is triangular, two sides of said triangle converging to an apex which forms a strait at the outer curvatures of said supersonic planar bend through which said condensed particles flow.

6. Apparatus as recited in claim 4 in which said cross-sectional configuration is essentially triangular, two sides of said triangle being curved and converging to an apex which forms a strait at the outer curvature of said supersonic planar bend through which said condensed particles flow.

7. Apparatus as recited in claim 1 including a strait formed at said apex adjusted in size to maintain said strait liquid filled during operations to aid in restricting passage of gas therethrough.

8. Apparatus as recited in claim 1 including a strait formed at said apex and separation material having desired properties of permeability, porosity and thickness positioned in said strait to restrict passage of gas therethrough.

9. Apparatus as recited in claim 8 in which said separation material is stationary.

10. Apparatus as recited in claim 8 in which said separation material is movable.

11. Apparatus as recited in claim 10 in which said separation materail is automatically movable.

12. Apparatus as recited in claim 8 in which said saparation material comprises flat material.

13. Apparatus as recited in claim 8 in which said separation materail comprises tubular material.

14. Apparatus as recited in claim 8 in which said separation material comprises material pretreated to make said material water wet.

15. Apparatus as recited in claim 8 in which said separation material comprises material pretreated to make said material oil wet.

16. Apparatus as recited in claim 8 in which said separation material comprises material pretreated to prevent adhesion of hydrates.

17. Apparatus as recited in claim 8 in which said separation material comprises material pretreated to prevent adhesion of paraffin.

18. Apparatus as recited in claim 8 in which said separation material comprises material pretreated to prevent adhesion of ice.

19. Apparatus as recited in claim 8 in which said separation material comprises an electrical heating element.

References Cited

UNITED STATES PATENTS

| | | | |
|---|---|---|---|
| 1,519,428 | 12/1924 | Wilisch | 55—461 |
| 3,258,897 | 7/1966 | Meyer et al. | 55—137 |

OTHER REFERENCES

Cornvich et al.: Handbook of Supersonic Aerodynamics Section 17, NAVWEPS Report 1488 (volume 6), January 1964, pp. 237–240 and 273–275.

REUBEN FRIEDMAN, Primary Examiner

C. N. HART, Assistant Examiner

U.S. Cl. X.R.

55—130, 134, 277, 461